(12) United States Patent
Abdellatif et al.

(10) Patent No.: US 12,472,769 B2
(45) Date of Patent: Nov. 18, 2025

(54) SYSTEM AND METHOD USING INTERNAL SHORT-CIRCUIT CONDUCTORS TO CONTROL MAGNETIC WHEEL ADHESION

(71) Applicant: Saudi Arabian Oil Company, Dhahran (SA)

(72) Inventors: Fadl Abdellatif, Thuwal (SA); Ahmed Al Brahim, Thuwal (SA)

(73) Assignee: Saudi Arabian Oil Company, Dhahran (SA)

(*) Notice: Subject to any disclaimer, the term of this patent is extended or adjusted under 35 U.S.C. 154(b) by 832 days.

(21) Appl. No.: 17/663,159

(22) Filed: May 12, 2022

(65) Prior Publication Data
US 2023/0364942 A1    Nov. 16, 2023

(51) Int. Cl.
*B60B 19/00* (2006.01)

(52) U.S. Cl.
CPC ...... *B60B 19/006* (2013.01); *B60B 2900/931* (2013.01)

(58) Field of Classification Search
CPC .................................................. B60B 19/006
See application file for complete search history.

(56) References Cited

U.S. PATENT DOCUMENTS

| | | |
|---|---|---|
| 3,978,441 A | 8/1976 | Sobottka et al. |
| 8,604,900 B2 | 12/2013 | Kocijan |
| 9,245,677 B2 | 1/2016 | Fullerton et al. |
| 9,849,722 B2 | 12/2017 | Parrott et al. |
| 10,336,133 B2 | 7/2019 | Lee |
| 2004/0130423 A1 | 7/2004 | Pahlback et al. |
| 2011/0248806 A1* | 10/2011 | Michael ............ H01F 7/04 335/295 |
| 2023/0356757 A1* | 11/2023 | Carbonell ......... B60B 19/006 |

FOREIGN PATENT DOCUMENTS

| | | |
|---|---|---|
| CA | 3059845 A1 | 4/2020 |
| CN | 104875807 A | 9/2015 |
| CN | 113788070 A * | 12/2021 |
| JP | 2944938 B2 | 9/1999 |
| JP | 2011172432 A | 9/2011 |
| JP | 2019084869 A | 6/2019 |
| KR | 101304690 B1 | 9/2013 |

OTHER PUBLICATIONS

Wei Song, et al.; Design of permanent magnetic wheel-type adhesion-locomotion system for water-jetting wall-climbing robot; https://journals.sagepub.com/doi/full/10.1177/1687814018787378; Jul. 16, 2018; 11 pages.

Mahmoud Tavakoli, et al.; Switchable magnets for robotics applications; http://www2.dem.uc.pt/pedro.neto/PUB/IC/IC_17.pdf; 2015.

* cited by examiner

*Primary Examiner* — S. Joseph Morano
*Assistant Examiner* — Alex Palmer
(74) *Attorney, Agent, or Firm* — Leason Ellis LLP

(57) ABSTRACT

A system and method control magnetic adhesion of a wheel to a surface using internal short-circuit conductors. The method includes providing the wheel having a first disc, apertures retaining magnets, and a conducting ring, and a second disc. In a first configuration, the second disc is isolated from the conducting ring to generate a first magnetic flux to increase adhesion. In a second configuration, magnetic interaction of the second disc and the conducting ring generates a second magnetic flux to decrease adhesion. The system implements the method.

20 Claims, 5 Drawing Sheets

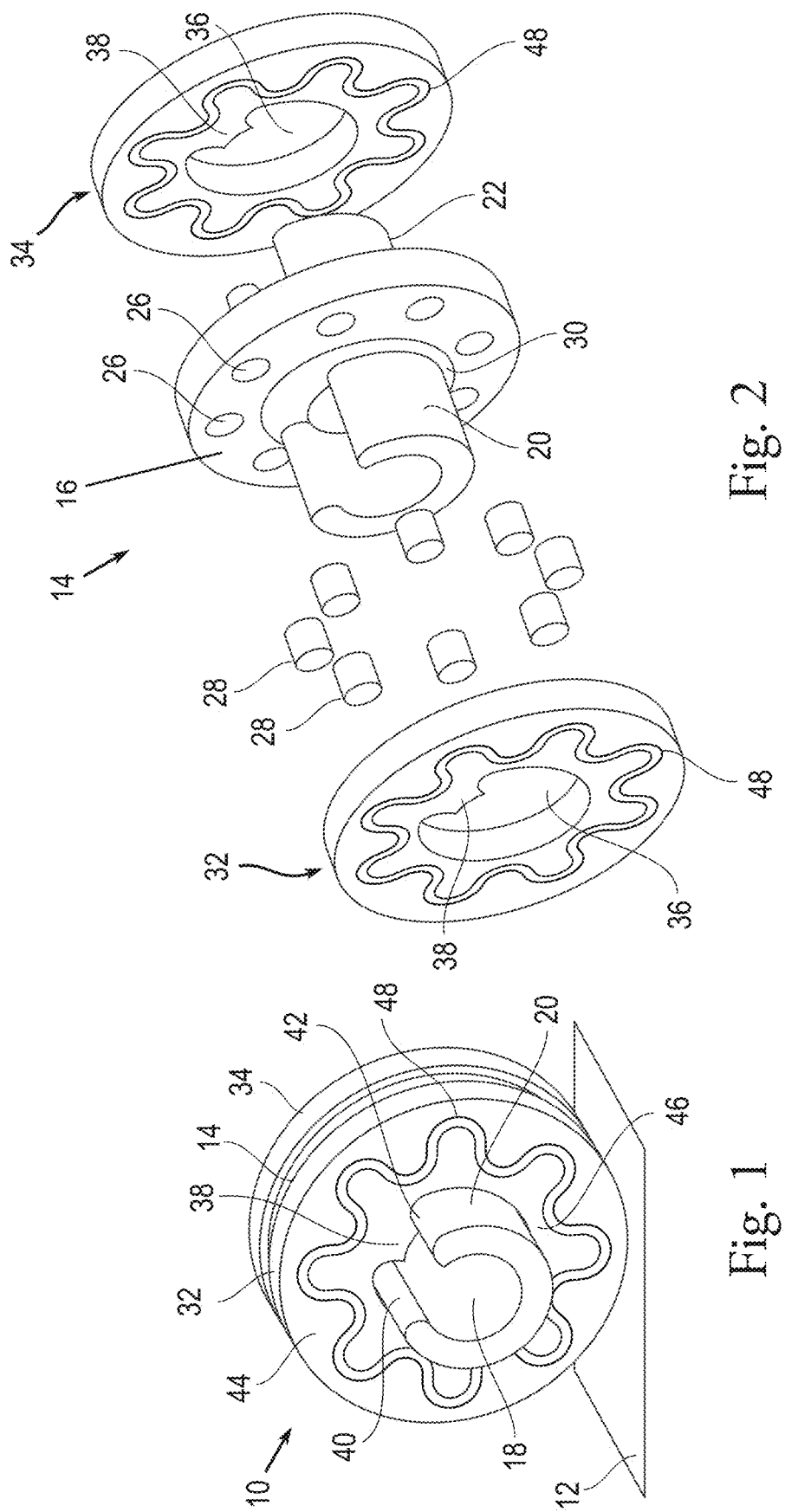

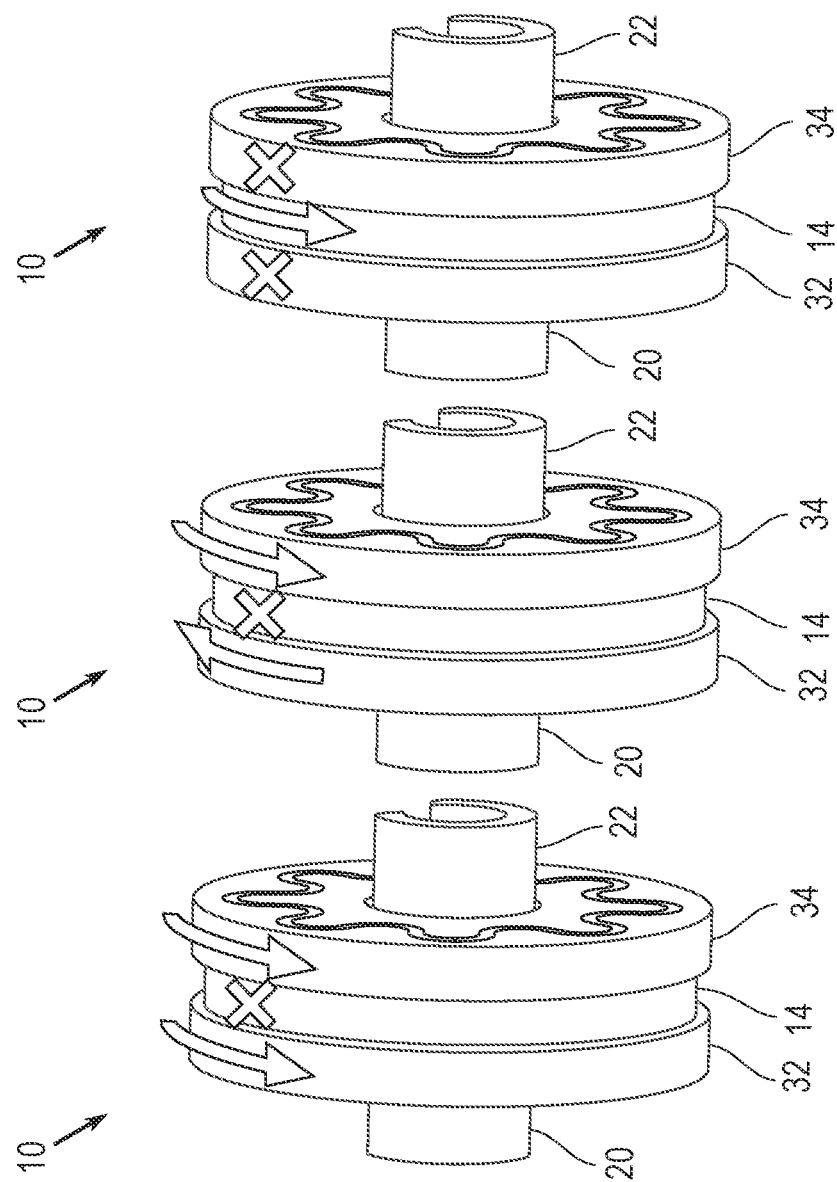

SYSTEM AND METHOD USING INTERNAL SHORT-CIRCUIT CONDUCTORS TO CONTROL MAGNETIC WHEEL ADHESION

FIELD OF THE DISCLOSURE

The present disclosure relates generally to magnetized wheels, and, more particularly, to a system and method using internal short-circuit conductors to control magnetic adhesion of a wheel to a ferromagnetic surface.

BACKGROUND OF THE DISCLOSURE

Magnetic wheels enable vehicles to climb and drive on ferromagnetic structures. For example, an unmanned aerial vehicle (UAV) can fly to a point on a ferromagnetic structure, perch at that point, and utilize magnetic wheels to adhere to the ferromagnetic structure. The magnetic adhesion is the result of magnetic flux passing through the surface from the magnet north pole to the magnetic south pole of a magnet in the wheel. Having a strong magnetic grip to the ferromagnetic surface is essential to prevent the vehicle from disengaging inadvertently and from falling from the ferromagnetic surface. However, a strong pulling force is required to overcome the magnetic adhesion to disengage the vehicle from the ferromagnetic surface. In order to enable vehicles to obtain a strong magnetic grip as well as easy disengagement, incorporation of a magnetic switch into the wheel is desirable.

SUMMARY OF THE DISCLOSURE

According to an embodiment consistent with the present disclosure, a system and method use internal short-circuit conductors to control magnetic adhesion of a wheel to a ferromagnetic surface.

In an embodiment, a wheel configured to adhere magnetically to a ferromagnetic surface comprises an inner annular disc and a pair of outer annular discs. The inner annular disc is composed of a non-magnetic material and has a first outer circumferential periphery, a first central axial bore configured to retain an axle, a plurality of apertures disposed adjacent to the outer circumferential periphery and configured to retain a plurality of magnets, and a conducting ring disposed adjacent to and surrounding the first central axial bore. The pair of outer annular discs are composed of a ferromagnetic material and are disposed on either side of the inner annular disc, with each outer annular disc having a second outer circumferential periphery, a second central axial bore configured to retain an axle, an inner circumferential periphery disposed adjacent to the second central axial bore, and an isolator ring composed of a non-magnetic material and defining a plurality of curves extending in a serpentine manner circumferentially around the inner circumferential periphery intermediate of the second outer circumferential periphery and the second central axial bore, with the curves of the serpentine isolator ring disposed between the inner circumferential periphery and the second outer circumferential periphery.

In a first configuration, the curves of the serpentine isolator ring are disposed in a first position relative to the plurality of magnets to magnetically isolate the pair of outer discs from the conducting ring, thereby generating a first magnetic flux between the plurality of magnets and the ferromagnetic surface to increase the adhesion of the wheel to the ferromagnetic surface. In a second configuration, at least one outer annular disc is rotated about the axle relative to the inner annular disc to dispose the curves of the serpentine isolator ring in a second position relative to the plurality of magnets to allow magnetic interaction between the pair of outer discs and the conducting ring, thereby generating a second magnetic flux between the plurality of magnets and the ferromagnetic surface to decrease the adhesion of the wheel to the ferromagnetic surface. The second magnetic flux is less than the first magnetic flux.

The conducting ring can be composed of steel. Alternatively, the conducting ring can be composed of nickel. In another alternative embodiment, the conducting ring can be composed of cobalt. The plurality of magnets can be permanent magnets. Alternatively, the plurality of magnets can be electromagnets. The plurality of apertures can be cylindrical. The plurality of magnets can be cylindrical.

In another embodiment, a wheel configured to adhere magnetically to a ferromagnetic surface comprises a first annular disc and a second annular disc. The first annular disc is composed of a non-magnetic material and has a first outer circumferential periphery, a first central axial bore configured to retain an axle, a plurality of apertures disposed adjacent to the outer circumferential periphery and configured to retain a plurality of magnets, and a conducting ring disposed adjacent to and surrounding the first central axial bore. The second annular disc is composed of a ferromagnetic material and is disposed on one side of the first annular disc. The second annular disc has a second outer circumferential periphery, a second central axial bore configured to retain an axle, an inner circumferential periphery disposed adjacent to the second central axial bore, and an isolator ring composed of a non-magnetic material and defining a plurality of curves extending in a serpentine manner circumferentially around the inner circumferential periphery intermediate of the second outer circumferential periphery and the second central axial bore, with the curves of the serpentine isolator ring disposed between the inner circumferential periphery and the second outer circumferential periphery.

In a first configuration, the curves of the serpentine isolator ring are disposed in a first position relative to the plurality of magnets to magnetically isolate the second annular disc from the conducting ring, thereby generating a first magnetic flux between the plurality of magnets and the ferromagnetic surface to increase the adhesion of the wheel to the ferromagnetic surface. In a second configuration, the second annular disc is rotated about the axle relative to the first annular disc to dispose the curves of the serpentine isolator ring in a second position relative to the plurality of magnets to allow magnetic interaction between the second annular disc and the conducting ring, thereby generating a second magnetic flux between the plurality of magnets and the ferromagnetic surface to decrease the adhesion of the wheel to the ferromagnetic surface. The second magnetic flux is less than the first magnetic flux.

The conducting ring can be composed of steel. Alternatively, the conducting ring can be composed of nickel. In another alternative embodiment, the conducting ring can be composed of cobalt. The plurality of magnets can be permanent magnets. Alternatively, the plurality of magnets can be electromagnets. The plurality of apertures can be cylindrical. The plurality of magnets can be cylindrical.

In a further embodiment, a method of adhering a wheel magnetically to a ferromagnetic surface comprises providing a wheel having a first annular disc and a second annular disc, wherein the first annular disc is composed of a non-magnetic material and has a first outer circumferential periphery, a first central axial bore configured to retain an axle, a plurality of apertures disposed adjacent to the outer circumferential periphery and configured to retain a plurality of magnets, and a conducting ring disposed adjacent to and surrounding the first central axial bore. The second annular disc is composed of a ferromagnetic material and is disposed on one side of the first annular disc. The second annular disc has a second outer circumferential periphery, a second central axial bore configured to retain an axle, an inner circumferential periphery disposed adjacent to the second central axial bore, and an isolator ring composed of a non-magnetic material and defining a plurality of curves extending in a serpentine manner circumferentially around the inner circumferential periphery intermediate of the second outer circumferential periphery and the second central axial bore, with the curves of the serpentine isolator ring disposed between the inner circumferential periphery and the second outer circumferential periphery.

The method further comprises disposing the first and second annular discs in a first configuration wherein the curves of the serpentine isolator ring are disposed in a first position relative to the plurality of magnets, magnetically isolating the second annular disc from the conducting ring, and generating a first magnetic flux between the plurality of magnets and the ferromagnetic surface thereby increasing the adhesion of the wheel to the ferromagnetic surface. The method further comprises disposing the first and second annular discs in a second configuration, wherein the second annular disc is rotated about the axle relative to the first annular disc, disposing the curves of the serpentine isolator ring in a second position relative to the plurality of magnets, allowing magnetic interaction between the second annular disc and the conducting ring, and generating a second magnetic flux between the plurality of magnets and the ferromagnetic surface to decrease the adhesion of the wheel to the ferromagnetic surface. The second magnetic flux is less than the first magnetic flux.

The conducting ring can be composed of a ferromagnetic material, such as steel. Alternatively, the conducting ring can be composed of nickel. In another alternative embodiment, the conducting ring can be composed of cobalt. The plurality of magnets can be permanent magnets. The plurality of magnets can be electromagnets. The plurality of apertures can be cylindrical. The plurality of magnets can be cylindrical.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

FIG. 1 is a diagram of a wheel, according to an embodiment.

FIG. 2 is a diagram of the wheel of FIG. 1 with parts separated.

FIG. 3 illustrates outer discs of the wheel of FIG. 1 rotating in a common direction relative to an inner disc.

FIG. 4 illustrates the outer discs of the wheel of FIG. 1 rotating in opposite directions relative to the inner disc.

FIG. 5 illustrates the inner disc of the wheel of FIG. 1 rotating relative to both of the outer discs.

Figure 6:
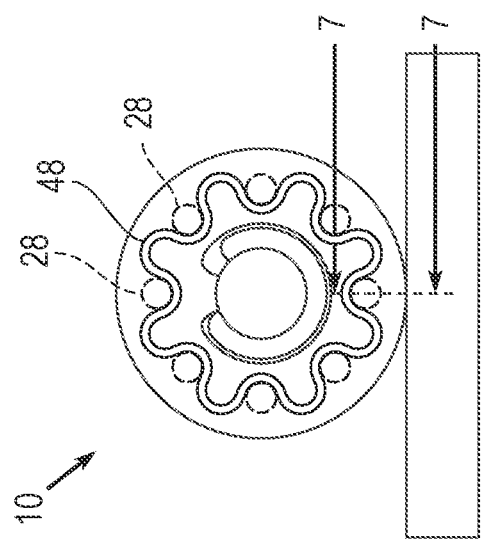
FIG. 6 is a cross-sectional view of the wheel of FIG. 1 in a first configuration.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method using internal short-circuit conductors to control magnetic adhesion of a wheel to a ferromagnetic surface.

Referring to FIGS. 1-9, the wheel 10 is configured to roll on a surface 12. Using the system and method described below, when the surface 12 is ferromagnetic, a magnetic flux generated by the wheel 10 can be controlled to increase or decrease magnetic adhesion of the wheel 10 to the ferromagnetic surface 12. As shown in FIGS. 1-2, the wheel 10 has an inner disc 14 having a pair of planar sides 16. The inner disc 14 is composed of a non-magnetic material. For example, the inner disc 14 can be composed of plastic. The inner disc 14 is generally annular with a first central axial bore 18 partially surrounded by a disc retainer 20, 22 extending perpendicularly from at least one of the planar sides 16. The first central axial bore 18 is configured to receive an axle to roll the wheel 10 about the axle on the surface 12. A plurality of apertures 26 extend perpendicularly and at least partially into at least one of the planar sides 16. The plurality of apertures 26 are disposed adjacent to the outer circumferential periphery and configured to retain a plurality of magnets 28. The magnets 28 can be permanent magnets. Alternatively, the magnets 28 can be electromagnets. The magnets 28 are sized and dimensioned to be retained in the respective apertures 26. In an example embodiment, the apertures 26 are cylindrical, and the magnets 28 are also cylindrical. A conducting ring 30 is disposed in an inner periphery of the inner disc 14. The conducting ring 30 extends around the first central axial bore 18. The conducting ring 30 can be composed of steel. Alternatively, the conducting ring 30 can be composed of nickel. In another alternative embodiment, the conducting ring 30 can be composed of cobalt. The conducting ring 30 can also be composed of other ferromagnetic materials.

The wheel 10 also has at least one outer disc 32, 34 disposed adjacent to a respective planar side of the inner disc 14. Each outer disc 32, 34 is composed of a ferromagnetic material. For example, each outer disc 32, 34 can be composed of steel. Alternatively, each outer disc 32, 34 can be composed of nickel. In another alternative embodiment, each outer disc 32, 34 can be composed of cobalt. The outer discs 32, 34 can also be composed of other ferromagnetic materials. Each outer disc 32, 34 has a central axial bore 36 configured to receive a respective disc retainer 20, 22 through which an axle passes. The central axial bore 36 of each outer disc 32, 34 has a rotation stopper 38 for engaging radial sides 40, 42 of a respective disc retainer 20, 22. The radial sides 40, 42 limit the rotation of each outer disc 32, 34 relative to the inner disc 14 to a predetermined angle. The predetermined angle is equal to 180°/(the number of magnets of the inner disc). For example, in an embodiment with eight magnets, the predetermined angle can be about 180°/8, which is about 22.5°. Using a different number of magnets would change the predetermined angle. For example, for ten magnets, the rotation angle can be about 180°/10, which is about 18°. It is also understood that other sizes and dimensions of the outer diameters of the discs as well as the aperture sizes are contemplated.

Referring again to FIGS. 1-2, each outer disc 32, 34 has an outer circumferential periphery 44 and an inner circumferential periphery 46 disposed adjacent to the central axial bore 36. An isolator ring 48 composed of a non-magnetic material and defining a plurality of curves extends in a serpentine manner circumferentially around the inner circumferential periphery 46 intermediate of the outer circumferential periphery 44 and the central axial bore 36, with the curves of the serpentine isolator ring 48 disposed between the inner circumferential periphery 46 and the outer circumferential periphery 44. The isolator ring 48 can be composed of plastic.

As described above, rotation of each outer disc 32, 34 can be performed relative to the inner disc 14 to within a predetermined angle. FIG. 3 illustrates outer discs 32, 34 of the wheel 10 rotating in a common direction relative to the inner disc 14. As shown in FIG. 3, the inner disc 14 can be motionless as the outer discs 32, 34 rotate in a common direction. FIG. 4 illustrates the outer discs 32, 34 of the wheel 10 rotating in opposite directions relative to the inner disc 14. As shown in FIG. 4, the inner disc 14 can be motionless as the outer discs 32, 34 rotate in opposite directions. FIG. 5 illustrates the inner disc 14 of the wheel 10 rotating relative to both of the outer discs 32, 34. As shown in FIG. 5, the inner disc 14 can be rotated as the outer discs 32, 34 remain motionless.

Figure 7:
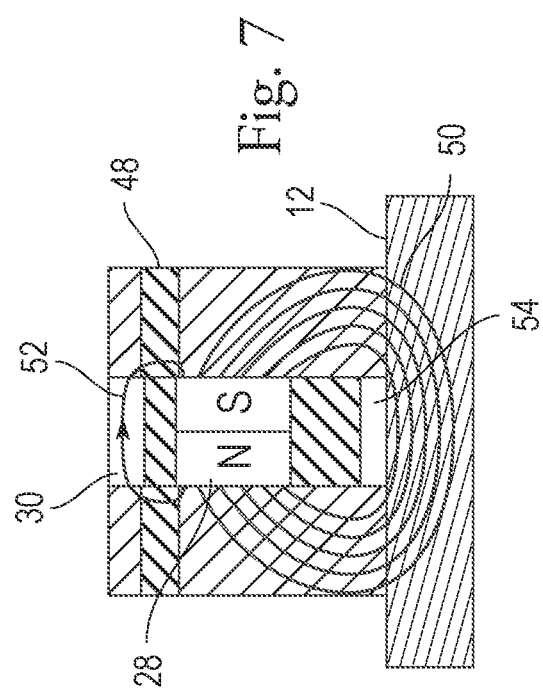
FIG. 7 illustrates the magnetic flux of the wheel in the first configuration of FIG. 6 along lines 7-7.
Figure 8:
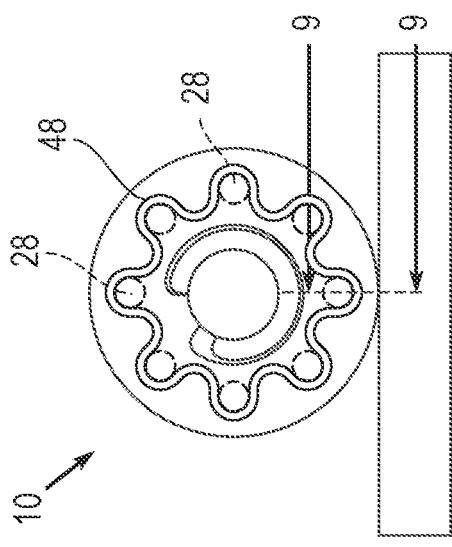
FIG. 8 is a cross-sectional view of the wheel of FIG. 1 in a second configuration.
Figure 9:
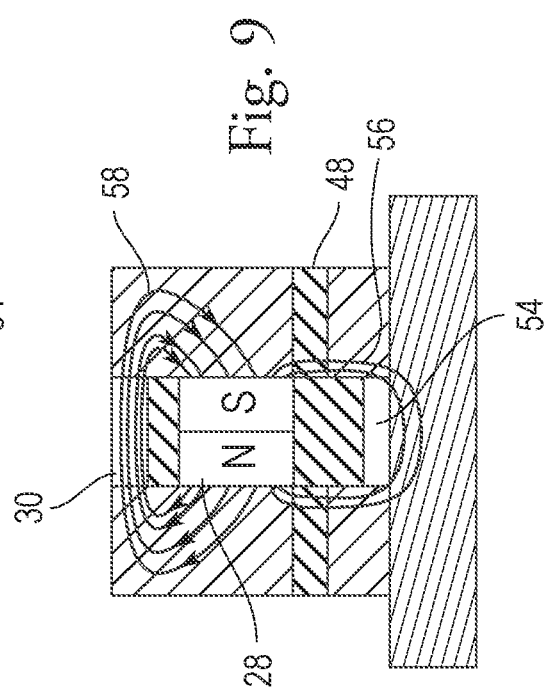
FIG. 9 illustrates the magnetic flux of the wheel in the second configuration of FIG. 8 along lines 9-9.

Regardless of the absolute motion of the inner disc 14 and the outer discs 32, 34, the relative motion of the discs 14, 32, 34 changes the wheel 10 from a first configuration, as shown in FIGS. 6-7, to a second configuration, as shown in FIG. 8-9. In the first configuration, the curves of the serpentine isolator ring 48 are disposed in a first position relative to the plurality of magnets 28 to magnetically isolate the outer annular discs 32, 34 from the conducting ring 30, thereby generating a first magnetic flux 50 between the plurality of magnets and the ferromagnetic surface 12 to increase the adhesion of the wheel to the ferromagnetic surface 12. A weaker magnetic flux 52 is also generated. An air gap 54 is formed between the inner disc 14 and the ferromagnetic surface 12.

In the second configuration, at least one outer annular disc 32, 34 is rotated about the axle relative to the inner annular disc 14 to dispose the curves of the serpentine isolator ring 48 in a second position relative to the plurality of magnets 28 to allow magnetic interaction between the outer annular discs 32, 34 and the conducting ring 30, thereby generating a second magnetic flux 56 between the plurality of magnets 28 and the ferromagnetic surface 12 to decrease the adhesion of the wheel 10 to the ferromagnetic surface 12. A stronger magnetic flux 58 is also generated between the outer annular discs 32, 34 and the conducting ring 30. However, the second magnetic flux 56 is less than the first magnetic flux 50 shown in FIG. 7, so there is less adhesion of the wheel 10 to the ferromagnetic surface 12 when in this second position.

Figure 11:
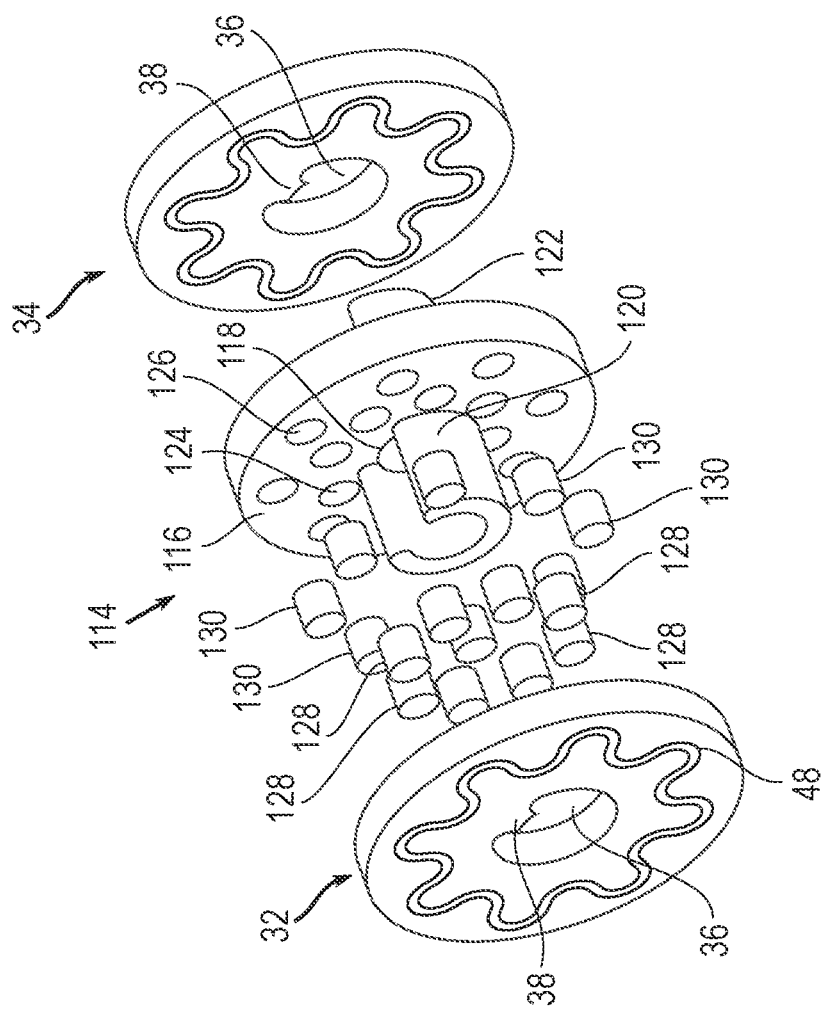
FIG. 11 is a diagram of the wheel of FIG. 10 with parts separated.
Figure 10:
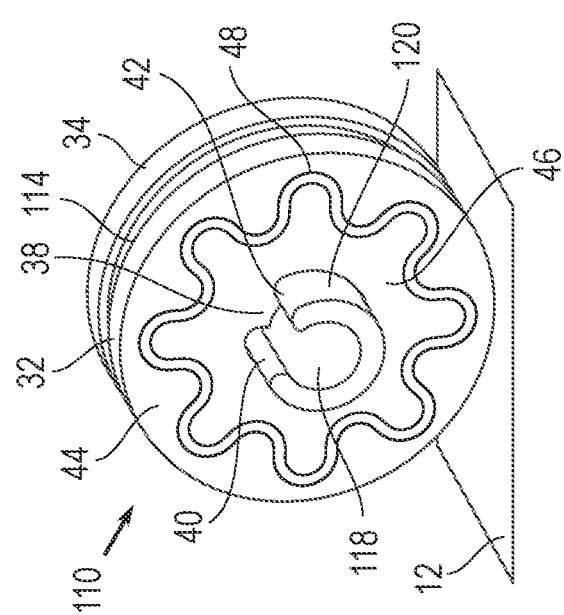
FIG. 10 is a diagram of an alternative embodiment of the wheel.

Referring to FIGS. 10-11, in an alternative embodiment, the wheel 110 is configured to roll on a surface 12. When the surface 12 is ferromagnetic, a magnetic flux generated by the wheel 110 can be controlled to increase or decrease magnetic adhesion of the wheel 110 to the ferromagnetic surface 12. As shown in FIGS. 10-11, the wheel 110 has an inner disc 114 having a pair of planar sides 116. The inner disc 114 is composed of a non-magnetic material. For example, the inner disc 114 can be composed of plastic. The inner disc 114 is generally annular with a first central axial bore 118 partially surrounded by a disc retainer 120, 122 extending perpendicularly from at least one of the planar sides 116. The central axial bore 118 is configured to receive an axle to roll the wheel 110 about the axle on the surface 12. A plurality of apertures 124, 126 extend perpendicularly and at least partially into at least one of the planar sides 116. A first plurality of apertures 124 are disposed adjacent to the first central axial bore 118 and configured to retain a first plurality of magnets 128 as inner magnets. A second plurality of apertures 126 are disposed adjacent to the outer circumferential periphery and configured to retain a second plurality of magnets 130 as outer magnets. The magnets 128, 130 are sized and dimensioned to be retained in the respective apertures 124, 126. In an example embodiment, the apertures 124, 126 are cylindrical, and the magnets 128, 130 are also cylindrical.

The wheel 110 also has at least one outer disc 32, 34 disposed adjacent to a respective planar side of the inner disc 114. Each outer disc 32, 34 is composed of a ferromagnetic material. For example, each outer disc 32, 34 can be composed of steel. Alternatively, each outer disc 32, 34 can be composed of nickel. In another alternative embodiment, each outer disc 32, 34 can be composed of cobalt. Each outer disc 32, 34 has a central axial bore 36 configured to receive a respective disc retainer 20, 22 through which an axle passes. The central axial bore 36 of each outer disc 32, 34 has a rotation stopper 38 for engaging radial sides 40, 42 of a respective disc retainer 20, 22. The radial sides 40, 42 limit the rotation of each outer disc 32, 34 relative to the inner disc 114 to a predetermined angle. The predetermined angle is equal to 180°/(the number of outer magnets of the inner disc). For example, in an embodiment with eight outer magnets 130, the predetermined angle can be about 180°/8, which is about 22.5°. Using a different number of outer magnets would change the predetermined angle. For example, for ten outer magnets, the rotation angle can be about 180°/10, which is about 18°. It is also understood that other sizes and dimensions of the outer diameters of the discs as well as the aperture sizes are contemplated.

The relative motion of the discs 114, 32, 34 changes the wheel 110 from a first configuration to a second configuration. In the first configuration, the curves of the serpentine isolator ring 48 are disposed in a first position relative to the second plurality of magnets 130 to magnetically isolate the first plurality of magnets 128 from the second plurality of magnets 130, thereby generating a first magnetic flux between the second plurality of magnets and the ferromagnetic surface 12 to increase the adhesion of the wheel to the ferromagnetic surface 12. In the second configuration, at least one outer annular disc 32, 34 is rotated about the axle relative to the inner annular disc 114 to dispose the curves of the serpentine isolator ring 48 in a second position relative to the second plurality of magnets 130 to allow magnetic interaction between the first plurality of magnets 128 and the second plurality of magnets 130, thereby generating a second magnetic flux between the second plurality of magnets 130 and the ferromagnetic surface 12 to decrease the adhesion of the wheel 110 to the ferromagnetic surface 12. However, the second magnetic flux is less than the first magnetic flux, so there is less adhesion of the wheel 110 to the ferromagnetic surface 12.

Figure 12:
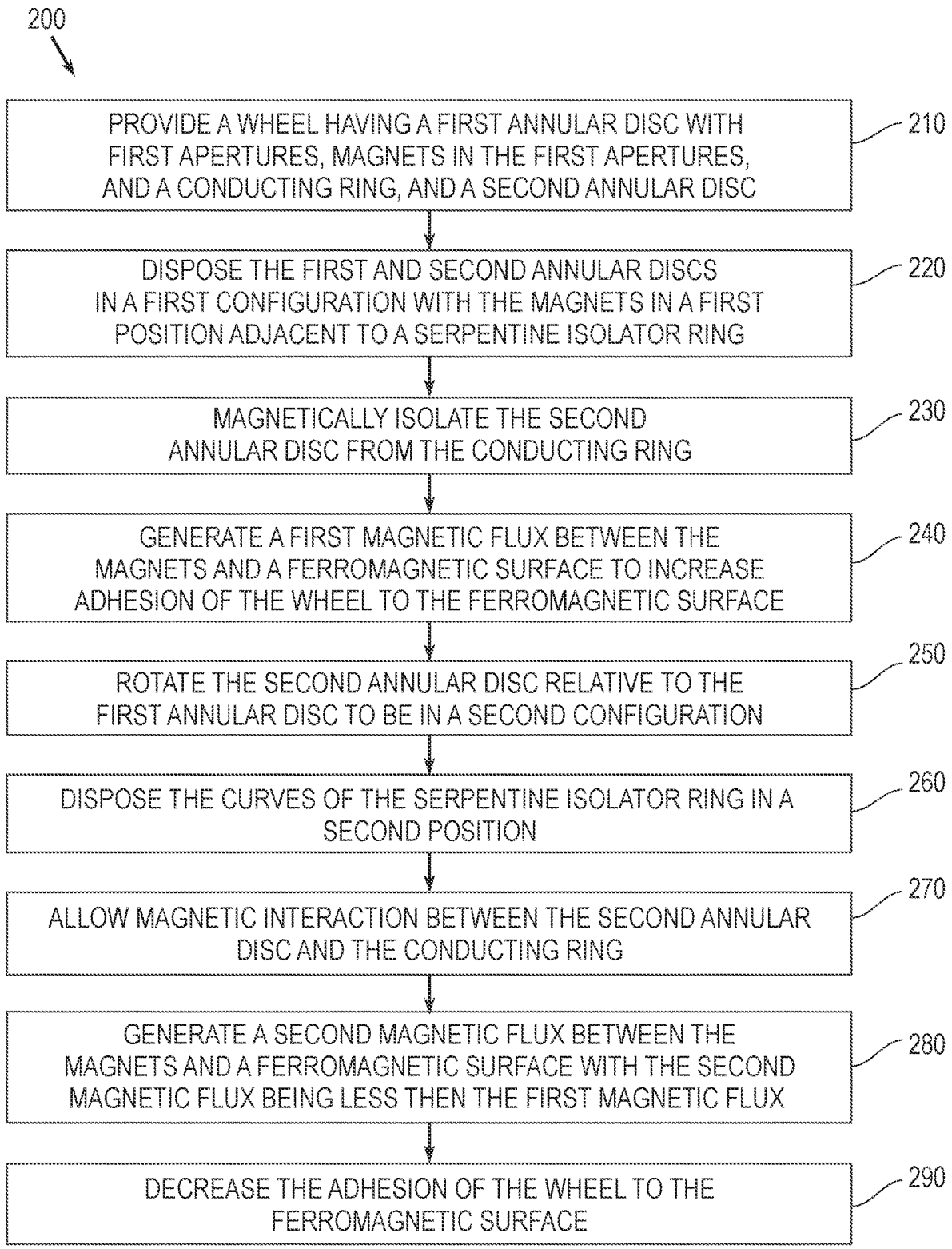
FIG. 12 is a flowchart of the method of operation of the wheel of FIG. 1.

As shown in FIG. 12, a method 200 includes the step of providing the wheel 10 in step 210, with the wheel 10 having a first annular disc with apertures retaining magnets and a conducting ring, and having a second annular disc with a serpentine isolator ring. The method 200 then disposes the first and second annular discs in a first configuration in step 220 with curves of the serpentine isolator ring in a first position relative to the magnets. The method 200 then magnetically isolates the second annular disc from the conducting ring in step 230. The method 200 then generates a first magnetic flux between the magnets and a ferromagnetic surface in step 240 to increase the adhesion of the wheel to the ferromagnetic surface. The method 200 then rotates the second annular disc relative to the first annular disc to be in a second configuration in step 250, and disposes the curves of the serpentine isolator ring in a second position in step 260. The method 200 then allows magnetic interaction between the second annular disc and the conducting ring in step 270, and generates a second magnetic flux between the magnets and the ferromagnetic surface in step 280, with the second magnetic flux being less than the first magnetic flux. The method 200 then decreases the adhesion of the wheel to the ferromagnetic surface in step 290.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A wheel having an axle and configured to adhere magnetically to a ferromagnetic surface, comprising:
   an inner annular disc composed of a non-magnetic material and having:
      a first outer circumferential periphery;
      a first central axial bore configured to retain the axle;
      a plurality of apertures disposed adjacent to the outer circumferential periphery and configured to retain a plurality of magnets; and
      a conducting ring disposed adjacent to and surrounding the first central axial bore; and
   a pair of outer annular discs composed of a ferromagnetic material and disposed on either side of the inner annular disc, with each outer annular disc having:
      a second outer circumferential periphery;
      a second central axial bore configured to retain the axle;
      an inner circumferential periphery disposed adjacent to the second central axial bore; and
      an isolator ring composed of a non-magnetic material and defining a plurality of curves extending in a serpentine manner circumferentially around the inner circumferential periphery intermediate of the second outer circumferential periphery and the second central axial bore, with the serpentine curves of the isolator ring disposed between the inner circumferential periphery and the second outer circumferential periphery,
   wherein in a first configuration, the serpentine curves of the isolator ring are disposed in a first position relative to the plurality of magnets to magnetically isolate the pair of outer discs from the conducting ring, thereby generating a first magnetic flux between the plurality of magnets and the ferromagnetic surface to increase the adhesion of the wheel to the ferromagnetic surface, and
   wherein in a second configuration, at least one outer annular disc is rotated about the axle relative to the inner annular disc to dispose the serpentine curves of the isolator ring in a second position relative to the plurality of magnets to allow magnetic interaction between the pair of outer discs and the conducting ring, thereby generating a second magnetic flux between the plurality of magnets and the ferromagnetic surface to decrease the adhesion of the wheel to the ferromagnetic surface, wherein the second magnetic flux is less than the first magnetic flux.

2. The wheel of claim 1, wherein the conducting ring is composed of a ferromagnetic material selected from the group consisting of steel, nickel, and cobalt.

3. The wheel of claim 1, wherein each of the plurality of magnets is a permanent magnet.

4. The wheel of claim 1, wherein each of the plurality of magnets is an electromagnet.

5. The wheel of claim 1, wherein each of the plurality of apertures is cylindrical.

6. The wheel of claim 5, wherein each of the plurality of magnets is cylindrical.

7. A wheel having an axle and configured to adhere magnetically to a ferromagnetic surface, comprising:
  a first annular disc composed of a non-magnetic material and having:
    a first outer circumferential periphery;
    a first central axial bore configured to retain the axle;
    a plurality of apertures disposed adjacent to the outer circumferential periphery and configured to retain a plurality of magnets; and
    a conducting ring disposed adjacent to and surrounding the first central axial bore; and
  a second annular disc composed of a ferromagnetic material and disposed on one side of the first annular disc, with the second annular disc having:
    a second outer circumferential periphery;
    a second central axial bore configured to retain the axle;
    an inner circumferential periphery disposed adjacent to the second central axial bore; and
    an isolator ring composed of a non-magnetic material and defining a plurality of curves extending in a serpentine manner circumferentially around the inner circumferential periphery intermediate of the second outer circumferential periphery and the second central axial bore, with the serpentine curves of the isolator ring disposed between the inner circumferential periphery and the second outer circumferential periphery,
  wherein in a first configuration, the serpentine curves of the isolator ring are disposed in a first position relative to the plurality of magnets to magnetically isolate the second annular disc from the conducting ring, thereby generating a first magnetic flux between the plurality of magnets and the ferromagnetic surface to increase the adhesion of the wheel to the ferromagnetic surface, and
  wherein in a second configuration, the second annular disc is rotated about the axle relative to the first annular disc to dispose the serpentine curves of the isolator ring in a second position relative to the plurality of magnets to allow magnetic interaction between the second annular disc and the conducting ring, thereby generating a second magnetic flux between the plurality of magnets and the ferromagnetic surface to decrease the adhesion of the wheel to the ferromagnetic surface,
  wherein the second magnetic flux is less than the first magnetic flux.

8. The wheel of claim 7, wherein the conducting ring is composed of a ferromagnetic material selected from the group consisting of steel, nickel, and cobalt.

9. The wheel of claim 7, wherein each of the plurality of magnets is a permanent magnet.

10. The wheel of claim 7, wherein each of the plurality of magnets is an electromagnet.

11. The wheel of claim 7, wherein each of the plurality of apertures is cylindrical.

12. The wheel of claim 11, wherein each of the plurality of magnets is cylindrical.

13. A method of adhering a wheel magnetically to a ferromagnetic surface, comprising:
  providing a wheel having an axle, a first annular disc, and a second annular disc, wherein the first annular disc is composed of a non-magnetic material and has:
    a first outer circumferential periphery;
    a first central axial bore configured to retain the axle;
    a plurality of apertures disposed adjacent to the outer circumferential periphery and configured to retain a plurality of magnets; and
    a conducting ring disposed adjacent to and surrounding the first central axial bore; and
  wherein the second annular disc is composed of a ferromagnetic material and disposed on one side of the first annular disc, with the second annular disc having:
    a second outer circumferential periphery;
    a second central axial bore configured to retain the axle;
    an inner circumferential periphery disposed adjacent to the second central axial bore; and
    an isolator ring composed of a non-magnetic material and defining a plurality of curves extending in a serpentine manner circumferentially around the inner circumferential periphery intermediate of the second outer circumferential periphery and the second central axial bore, with the serpentine curves of the isolator ring disposed between the inner circumferential periphery and the second outer circumferential periphery;
  disposing the first and second annular discs in a first configuration wherein the serpentine curves of the isolator ring are disposed in a first position relative to the plurality of magnets;
  magnetically isolating the second annular disc from the conducting ring; and
  generating a first magnetic flux between the plurality of magnets and the ferromagnetic surface thereby increasing the adhesion of the wheel to the ferromagnetic surface.

14. The method of claim 13, further comprising:
  disposing the first and second annular discs in a second configuration, wherein the second annular disc is rotated about the axle relative to the first annular disc;
  disposing the serpentine curves of the isolator ring in a second position relative to the plurality of magnets;
  allowing magnetic interaction between the second annular disc and the conducting ring; and
  generating a second magnetic flux between the plurality of magnets and the ferromagnetic surface to decrease the adhesion of the wheel to the ferromagnetic surface,
  wherein the second magnetic flux is less than the first magnetic flux.

15. The method of claim 13, wherein the conducting ring is composed of a ferromagnetic material.

16. The method of claim 15, wherein the conducting ring is composed of a ferromagnetic material selected from the group consisting of steel, nickel, and cobalt.

17. The method of claim 13, wherein each of the plurality of magnets is a permanent magnet.

18. The method of claim 13, wherein each of the plurality of magnets is an electromagnet.

19. The method of claim 13, wherein each of the plurality of apertures is cylindrical.

20. The method of claim 18, wherein each of the plurality of magnets is cylindrical.

\* \* \* \* \*